United States Patent [19]

Virgilio et al.

[11] 4,021,471
[45] May 3, 1977

[54] FORMAMIDINES USEFUL AS ULTRAVIOLET LIGHT ABSORBERS

[75] Inventors: Joseph A. Virgilio, Wayne; Milton Manowitz, Fairlawn, both of N.J.

[73] Assignee: Givaudan Corporation, Clifton, N.J.

[22] Filed: Apr. 18, 1974

[21] Appl. No.: 462,051

[52] U.S. Cl. .................... 260/471 R; 260/45.85 A
[51] Int. Cl.² ........................................ C07C 101/68
[58] Field of Search ............................. 260/471 R

[56] References Cited

UNITED STATES PATENTS

| | | | |
|---|---|---|---|
| 3,663,610 | 5/1972 | Elsevy | 260/518 R |
| 3,751,466 | 8/1973 | Menasse et al. | 260/471 R |

FOREIGN PATENTS OR APPLICATIONS

| | | |
|---|---|---|
| 79,06M | 2/1971 | France |
| 1,768,787 | 4/1972 | Germany |
| 1,768,908 | 4/1972 | Germany |
| 1,920,641 | 11/1969 | Germany |
| 2,115,625 | 10/1972 | Germany |
| 698,546 | 11/1940 | Germany |

OTHER PUBLICATIONS

Mandel, JACS, 76, pp. 3978–3982 (1954).

*Primary Examiner*—Anton H. Sutto
*Assistant Examiner*—Michael Shippen
*Attorney, Agent, or Firm*—Thomas Cifelli, Jr.

[57] ABSTRACT

Novel substituted formamidines are useful as ultraviolet light absorbers, the formamidines being characterized by the formula:

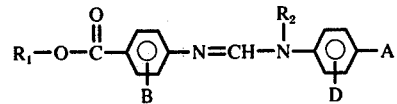

wherein:
$R_1$ represents an alkyl group containing one to five carbon atoms;
B is selected from the group consisting of H, OH, Cl or alkoxy;
$R_2$ represents a phenyl group or an alkyl group containing one to nine carbon atoms;
A is selected from the group consisting of H, carboalkoxy, alkoxy, alkyl, dimethylamino and halogen.
D is selected from the group consisting of H, methoxy and chlorine.

16 Claims, No Drawings

FORMAMIDINES USEFUL AS ULTRAVIOLET LIGHT ABSORBERS

BACKGROUND OF THE INVENTION

1. Field of the Invention

This invention relates to novel formamidines useful for protecting materials against the degradative effects of ultraviolet light.

2. The Prior Art

It is known in the art that organic materials which possess ultraviolet light absorbing properties can be added to many other organic materials to protect these materials from being degraded or damaged by ultraviolet light. For example, various polymers, plastics, resins, cosmetics, dyes, pigments, lacquors, varnishes, textiles, etc. are subject to photodegradation by sunlight or ultraviolet radiation and such materials can often be protected by treatment with chemicals which will absorb the harmful rays and convert them to relatively harmless forms of energy.

The prior art does not teach that the novel substituted formamidines of this invention possess the outstanding light absorbing properties combined with the high photostability and thermal stability as herein disclosed.

SUMMARY OF THE INVENTION

In accordance with the present invention there is provided substituted formamidines of the general structure:

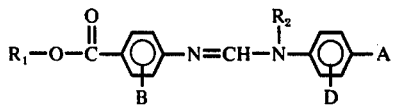

wherein:
- $R_1$ represents an alkyl group containing one to five carbon atoms:
- B is selected from the group consisting of H, OH, Cl or alkoxy;
- $R_2$ represents a phenyl group or an alkyl group containing one to nine carbon atoms;
- A is selected from the group consisting of H, carboalkoxy, alkoxy, alkyl, dimethylamino and halogen.
- D is selected from the group consisting of H, methoxy and chlorine.

The formamidines of this invention are particularly valuable as U.V. screening agents. As will be demonstrated they absorb over a wide range of the U.V. spectrum being particularly effective in the range from 280–370 nanometers. The formanidines are colorless and soluble in most organic solvents.

More significant and surprising is their remarkable resistance to photodegradation and thermal degradation. The formamidines of this invention are from about 5 to 30 times more resistant to photodegradation than the commercially available 2-hydroxy-4-methoxybenzophenone. The thermal stability is also illustrated by the fact that most of the formamidines were distilled at temperatures (boiling point) above 200° C. Toward the end of such distillations temperatures in the distilling vessel exceeded 300° C without any decomposition being noted. This resistance to thermal degradation is particularly useful in applications where high temperatures are required as, for example, in the molding of plastics.

The substituted formamidines of the present invention are prepared in a number of ways, the method chosen being dependent upon the starting material available.

A preferred method utilizes as intermediates the novel formimidates of the general formula:

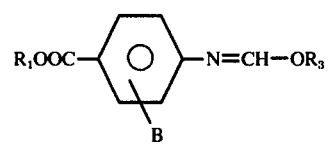

wherein:
$R_1$ and B are as defined previously and $R_3$ is an alkyl group of from one to five carbons. The novel formamidates, II, are prepared by reacting the corresponding 4-aminobenzoate with a trialkyl orthoformate as illustrated below. The reaction is effected by heating the reactants from

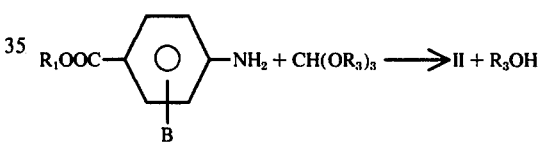

80° C to 200° C and the preferred temperature range is 130° to 160° C. The preferred procedure is to remove the alcohol which is formed during the reaction. The reaction is stopped when no more alcohol is produced. Any trialkylorthoformate may be used but it is preferred to use the commercially available triethyl or trimethyl orthoformates.

The novel formamidines, I, can be prepared by reacting the novel formimdates, II, with N-alkylanalines of general structure IV, as illustrated below: I, II, A, D, $R_2$ and $R_3$ being as previously defined. Reaction is effected by heating the reactants

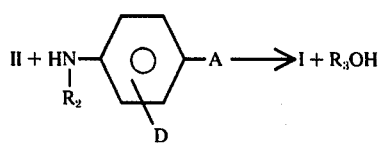

from 80° C to 250° C; the preferred temperature range being 170° C to 210° C. A preferred procedure is to remove the alcohol which is formed during the reaction. The reaction is stopped when no more alcohol is produced.

The N-alkylanilines, IV, can be prepared by any of the general methods known in the art. The N-alkylaniles, IV, used in this invention were prepared from the corresponding anilines, V, as shown below:

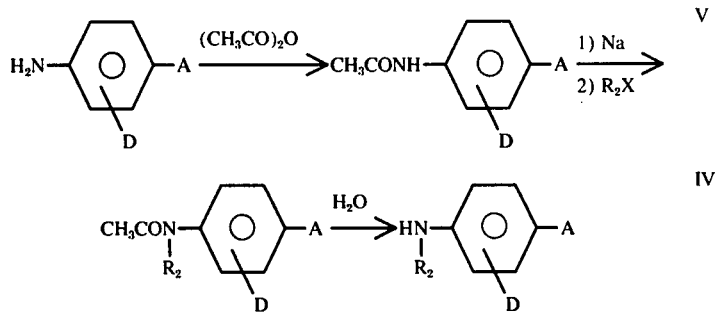

Any of the methods known in the art for monoacylating primary amines, alkylating amides and hydrolysing amides can be used in the preparation of the desired N-alkylanilines, IV. Another method for preparing the novel formamidines of this invention involves the reaction of an aminobenzoate of formula III with a formamide of the general formula VI in the presence of a suitable catalyst such as phosphorous pentachloride to form the formamidines of structure I as shown below:

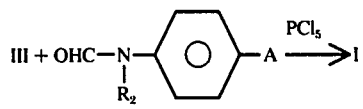

Another method for preparing the novel formamidines of this invention involves the alkylation of formamidines of general formula VII by methods known in the art.

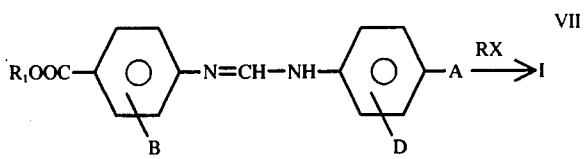

Detailed procedures of each of these methods are provided herein.

The strong ultraviolet light absorbing properties of the formamidines of this invention are demonstrated by dissolving the compounds in isopropanol and determining their spectrum using a recording ultraviolet spectrophotometer. Table I lists the wavelength of maximum absorption ($\lambda_{max}$), the intensity of this absorption calculated as molar extinction coefficient ($\epsilon$), and the $\lambda$ range where $\epsilon = 5,000$ or greater.

TABLE I

| Compound | Name | λ max (nm) | ε | λ range (nm) ε >5,000 |
|---|---|---|---|---|
| $C_1$ | N'-(4-Ethoxycarbonylphenyl)-N-methyl-N-phenylformamidine | 313 | 26,200 | 280 – 350* |
| $C_2$ | N'-(4-Ethoxycarbonylphenyl)-N-(4-methoxyphenyl)-N-methylformamidine | 312 | 26,300 | 280 – 355 |
| $C_3$ | N,N'-Bis(4-Ethoxycarbonylphenyl)-N-methyl-formamidine | 323 | 32,800 | 280 – 365 |
| $C_4$ | N-(4-Dimethylaminophenyl)-N'-(4-ethoxycarbonylphenyl)-N-methylformamidine | 324 | 22,100 | 280 – 368 |
| $C_5$ | N'-(4-Ethoxycarbonylphenyl)-N-(2-methoxyphenyl)-N-methylformamidine | 312 | 27,500 | 280 – 357 |
| $C_6$ | N'-(4-Ethoxycarbonylphenyl)-N-(3,4-dichlorophenyl)-N-methylformamidine | 312 | 29,500 | 280 – 357 |
| $C_7$ | N-(4-Butoxycarbonylphenyl)-N'-(4-ethoxycarbonylphenyl)-N-methylformamidine | 323 | 36,800 | 280 – 368 |
| $C_8$ | N'-(4-Butoxycarbonylphenyl)-N-methyl-N-phenylformamidine | 312 | 27,100 | 280 – 355 |
| $C_9$ | N'-(3-Hydroxy-4-methoxycarbonylphenyl)-N-methyl-N-phenylformamidine | 320 | 26,814 | 280 – 357 |
| $C_{10}$ | N-Butyl-N-phenyl-N'-(4-ethoxycarbonylphenyl)formamidine | 312 | 26,700 | 280 – 362 |
| $C_{11}$ | N'-(4-Ethoxycarbonylphenyl)-N-(n-octyl)-N-phenylformamidine | 314 | 28,300 | 280 – 357 |
| $C_{12}$ | N,N-Diphenyl-N'-(4-ethoxycarbonylphenyl)formamidine | 317 | 25,300 | 280 – 357 |
| $C_{13}$ | N'-(4-Ethoxycarbonyl-3-methoxyphenyl)-N'-methyl-N-phenylformamidine | 320 | 27,000 | 280 – 358 |
| $C_{14}$ | N'-(4-Isopropoxycarbonylphenyl)-N-methyl-N-phenylformamidine | 312 | 26,800 | 280 – 356 |
| $C_{15}$ | N'-(4-Ethoxycarbonylphenyl)-N-methyl-N-(p-ethylphenyl)formamidine | 313 | 27,000 | 280 – 357 |
| $C_{16}$ | N'-(2-Chloro-4-methoxycarbonylphenyl)-N-methyl-N-phenylformamidine | 318 | 25,800 | 280 – 360 |

*Only wavelengths above 280 nm were included.

The photostability of the formamidines of this invention was demonstrated in accelerated irradiation tests by exposing isopropanol solution of the compounds in pyrex flasks under a Hanovid lamp 679A (450 watts). Aliquots of these solutions were periodically examined spectrophotometrically to determine their rate of photodegradation. Results of these tests are listed in Table II including the test data for a commercially used hydroxybenzophenone type screening agent.

TABLE II

| Compound | Percent Degradation Exposure Time (hours) | | | |
|---|---|---|---|---|
| | 0 | 8 | 16 | 24 |
| $C_1$ | 0 | 7 | 7 | 7 |
| $C_2$ | 0 | 6 | 9 | 9 |
| $C_3$ | 0 | 0 | 2 | 3 |
| $C_4$ | 0 | 4 | 8 | 22 |
| $C_5$ | 0 | 3 | 5 | 19 |
| $C_6$ | 0 | 1 | 8 | 16 |
| $C_7$ | 0 | 2 | 3 | 9 |
| $C_8$ | 0 | 1 | 1 | 9 |
| $C_9$ | 0 | 3 | 5 | 10 |
| $C_{10}$ | 0 | 5 | 7 | 13 |
| $C_{11}$ | 0 | 2 | 7 | 15 |
| $C_{12}$ | 0 | 2 | 5 | 16 |
| 2-Hydroxy-4-methoxy-benzophenone | 0 | 2 | 75 | 100 |

The ability of the novel formamidines of this mixture to retard the discoloration of plastic films when incorporated therein is shown by the following described test and results.

Plastic films containing 0.4% by weight of the novel formamidines of this invention were prepared from a non-plasticized polyvinylchloride (87%) polyvinylacetate (13%) resin. The films were exposed to a Hanovia lamp 679A (450 watts) and periodically examined for discoloration. Results of these tests are listed in Table III using the following commercial ratings: o-no discoloration, 1-trace, 2-slight, 3-moderate, 4-severe.

TABLE III

| Compound | Discoloration Exposure Period (hours) | | | | | |
|---|---|---|---|---|---|---|
| | 0 | 8 | 16 | 24 | 48 | 80 |
| Control | 0 | 2 | 3 | 3 | 4 | 4 |
| $C_1$ | 0 | 0 | 0 | 1 | 2 | 2 |
| $C_2$ | 0 | 1 | 1 | 1 | 2 | 2 |
| $C_3$ | 0 | 1 | 1 | 2 | 3 | 3 |
| $C_5$ | 0 | 0 | 1 | 1 | 2 | 2 |
| $C_7$ | 0 | 0 | 1 | 1 | 2 | 2 |
| $C_8$ | 0 | 0 | 0 | 0 | 1 | 2 |
| $C_9$ | 0 | 0 | 0 | 0 | 1 | 2 |

The ability of the novel compound of this invention to retard the fading of dyes when incorporated therein is shown by the following described test and results.

Isopropanol solutions of the blue dye FD&C Blue No. 1, (H. Kohnstamm & Co.) containing 0.01% of a UV Absorber Formamidine of the invention were exposed to UV irradiation from G.E. fluorescent lamps F40BL. These solutions were periodically examined spectrophotometrically to determine the degree to which the dye has faded. The results are given in Table IV.

TABLE IV

| | FD&C Blue No. 1 Percent Degradation of UV Absorber Versus Exposure Time (days) | |
|---|---|---|
| | 14 | 20 |
| Control | 100 | |
| Tinuvin P | 60 | 80 |
| $C_2$ | 7 | 7 |
| $C_5$ | 20 | 20 |
| $C_7$ | 7 | 7 |

TABLE IV-continued

| | FD&C Blue No. 1 Percent Degradation of UV Absorber Versus Exposure Time (days) | |
|---|---|---|
| | 14 | 20 |
| $C_9$ | 60 | 67 |

The following examples are presented to provide a more detailed explanation of the present invention and are intended as illustrations and not limitations of the invention. Unless otherwise stated herein, the temperatures are in degrees Centigrade and all parts are by weight.

EXAMPLE I

Preparation of
N'-(4-Ethoxycarbonylphenyl)-N-methyl-N-phenylformamidine a. Ethyl (4-ethoxycarbonylphenyl)formimidate Ethyl 4-aminobenzoate (82.6 g, 0.50 mol) and triethyl orthoformate (148.2 g, 1.0 mol) were heated at 145° until 56 ml of ethanol had been collected by distillation. The excess triethyl orthoformate was removed by vacuum distillation. The residue was distilled to yield the formimidate required as an intermediate, bp. 142° C (0.1 mm), mp 41°-42° C.

Anal. Calcd for $C_{12}H_{15}NO_3$: C, 65.14; H, 6.83; N, 6.33.

Found: C, 65.01; H, 6.77; N, 6.54.

b. N'-(4-Ethoxycarbonylphenyl)-N-methyl-N-phenylformamidine

Ethyl N-(4-ethoxycarbonylphenyl formimidate (11.0 g, 0.05 mol) and N-methylaniline (5.4 g, 0.05 mol) were heated at 190° until 1.5 ml of ethanol had been collected by distillation. The viscous yellow oil was flash distilled through a short path distillation column to yield the desired product, bp. 188° C (0.1 mm).

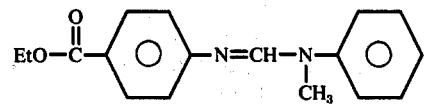

Anal. Calcd for $C_{17}H_{18}N_2O_2$: C, 72.33; H, 6.41; N, 9.92

Found: C, 72.22; H, 6.34; N, 9.89

EXAMPLE II

Preparation of N, N'-bis (4-Ethoxycarbonylphenyl)-N-methylformamidine

To a stirred solution of N,N'-bis(4-ethoxycarbonylphenyl)formamidine (6.8 g, 0.02 mol) in 50 ml of dimethylformamide was added 2.0 g of potassium hydroxide and 2 ml (0.02 mole) of dimethyl sulfate. The solution was stirred overnight and heated at 100° for 3 hrs. The reaction mixture was poured into 100 ml of water and the solid which precipated was collected by filtration and dried. The solid was triturated with 150 ml of benzene. The undissolved material was removed by filtration and the filtrate was concentrated to a solid residue. This solid residue was then triturated with 50 ml of chloroform. The remaining solids were removed by filtration. Concentration of the filtrate produced the desired product, mp 89°-91° C.

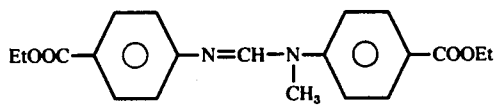

Anal. Calcd for $C_{20}H_{22}N_2O_4$: C, 67.78; H, 6.26; N, 7.90 Found C, 67.71; H, 6.34; N, 7.80

EXAMPLE III

Preparation of N,N-Diphenyl-N'-(4-ethoxycarbonylphenyl)formamidine

To a solution of N,N-diphenylformamide (19.7 g, 0.10 mol) in 100 ml of chloroform was added 22.8 g (0.11 mol) of phosphorus pentachloride in small portions. After the addition was completed the solution was refluxed for 1 hr. Ethyl 4-aminobenzoate (16.5 g, 0.10 mol) was added in small portions and the solution was refluxed 1 hr. The solution was poured into 100 ml of water and neutralized with concentrated ammonium hydroxide. The chloroform phase was separated, dried (MgSO$_4$), filtered and concentrated to yield a yellow oil. Purification by chromatography using silica gel/benzene yielded the desired product.

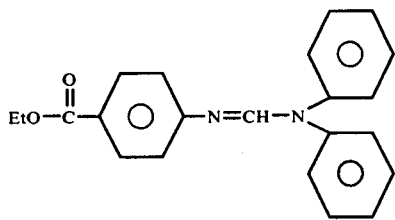

Anal. Calcd for $C_{22}H_{20}N_2O_2$: C, 76.71; H, 5.86; N, 8.13 Found: C, 76.62; H, 5.94; N, 8.38

EXAMPLE IV

Preparation of N'-(4-n-butoxycarbonylphenyl)-N-methyl-N-phenyl-formamidine

Ethyl N-(n-butoxycarbonylphenyl)formimidate was prepared from n-butyl-4-aminobenzoate by a process similar to that described in Example Ia.

A mixture of ethyl N-(n-butoxycarbonylphenyl)formimidate (5.0 g, 0.02 mol) and N-methylaniline (2.1 g, 0.02 mol) were heated at 190° until 1.7 ml of ethanol had been collected by distillation. The yellow oil was flash distilled through a short path distillation column to yield the product, bp≈204° C (0.08 mm).

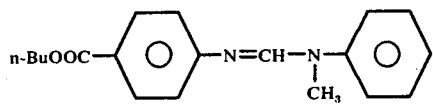

Anal. Calcd for $C_{19}H_{22}N_2O_2$: C, 73.52; H, 7.15; N, 9.02 Found C, 73.70; H, 7.15; N, 8.95

EXAMPLE V

Preparation of N-(4-n-Butoxycarbonylphenyl)-N'-(4'-ethoxycarbonylphenyl-N-methylformamidine Ethyl N-(4-ethoxycarbonylphenyl)formimidate (Example Ia) (6.7 g, 0.03 mol) and n-butyl 4-methylaminobenzoate (6.2 g, 0.03 mol) were heated at 190° until 1.7 ml of ethanol had been collected by distillation. The solid mass which resulted upon cooling was recrystallized from hexane to yield the product, mp 83°–85° C.

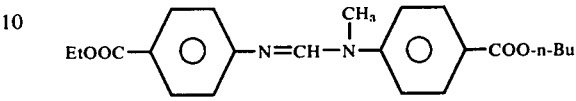

Anal. Calcd for $C_{22}H_{26}N_2O_4$: N, 7.32 Found: N, 7.23

EXAMPLE VI

Preparation of N'-(4-Ethoxycarbonylphenyl)-N-(2-methoxyphenyl)-N-methylformamidine A mixture of ethyl N-(4-ethoxycarbonylphenyl)formimidate (Example Ia) (4.9 g, 0.022 mol) and 2-methoxy-N-methylaniline (3.2 g, 0.022 mol) were heated at 180° until 1.3 ml of ethanol had been collected by distillation. The resulting yellow oil was flash distilled to yield the desired product, bp≈200° C (0.05 mm).

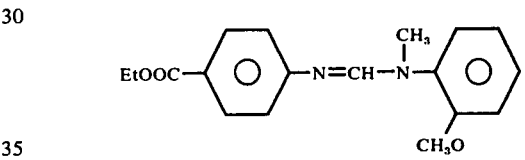

Anal. Calcd for $C_{18}H_{20}N_2O_3$: C, 69.21; H, 6.47; N, 8.96 Found C, 69.47; H, 6.49; N, 9.01

EXAMPLE VII preparation of N'-(4-Ethoxycarbonylphenyl)-N-(n-octyl)-N-phenyl-formamidine Ethyl N-(4-ethoxycarbonylphenyl)formimidate (Example Ia) (6.6 g, 0.03 mol) and N-octylaniline (6.2 g, 0.03 mol) were heated at 180° until 1.7 ml of ethanol had been collected by distillation. The resulting pale yellow oil was flash distilled to yield the desired product, bp≈235° C (0.05 mm).

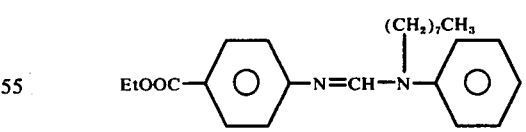

Anal. Calcd for $C_{24}H_{32}N_2O_2$: C, 75.74; H, 8.49; N, 7.36 Found: C, 75.74; H, 8.51; N, 7.36

EXAMPLE VIII

Preparation of N'-(3Hydroxy-4methoxycarbonylphenyl)-N-methyl-N-phenylformamidine Ethyl N-(3-hydroxy-4-methoxycarbonylphenyl)formimidate was prepared from n-butyl-4-aminobenzoate by a process similar to that described in Example Ia.

A mixture of ethyl N-(3-hydroxy-4-methoxycarbonylphenyl)formimidate (6.6 g, 0.03 mol) and N-methylaniline (3.2 g, 0.03 mol) were heated at 150° until 1.7 mol of ethanol had been collected by distillation. The pale yellow oil was flash distilled to yield the desired product, bp≈200° C (0.1 mm).

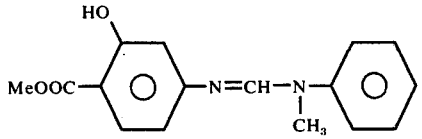

Anal. Calcd for $C_{16}H_{16}N_2O_3$: C, 67.60; H, 5.66; N, 9.85 Found: C, 67.39; H, 5.91; N, 10.06

What is claimed is:

1. A compound of the formula:

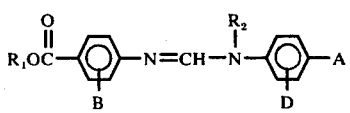

wherein:
$R_1$ is selected from the group consisting of alkyl radicals of from one to five carbon atoms;
B is selected from the group consisting of H, OH, Cl and methoxy;
$R_2$ is selected from the group consisting of alkyl radicals from one to nine carbon atoms and a phenyl radical;
A is selected from the group consisting of H, carboethoxy, carbobutoxy, methoxy, ethyl, dimethylamino and chlorine;
D is selected from the group consisting of H, $OCH_3$, Cl.

2. A compound according to claim 1: wherein:
$R_1$ is ethyl;
$R_2$ is methyl.

3. A compound according to claim 1: wherein:
$R_1$ is ethyl;
$R_2$ is methyl;
A is carboethoxy or carbobutoxy.

4. A compound according to claim 1 wherein:
$R_1$ is ethyl;
$R_2$ is methyl;
A, B and D are hydrogen.

5. A compound according to claim 1 wherein:
$R_1$ is ethyl;
$R_2$ is methyl;
A is $OCH_3$;
B and D are hydrogen.

6. A compound according to claim 1 wherein:
$R_1$ is ethyl;
$R_2$ is methyl;
A is carboethoxy ($-COOC_2H_5$);
B and D are hydrogen.

7. A compound according to claim 1 wherein:
$R_1$ is ethyl;
$R_2$ is methyl;
A is dimethylamino;
B and D are hydrogen.

8. A compound according to claim 1 wherein:
$R_1$ is ethyl;
$R_2$ is phenyl;
A, B and D are hydrogen.

9. A compound according to claim 1 wherein:
$R_1$ is ethyl;
$R_2$ is n-butyl;
A, B and D are hydrogen.

10. A compound according to claim 1 wherein:
$R_1$ is ethyl;
$R_2$ is n-octyl; A, B and D are hydrogen.

11. A compound according to claim 1 wherein:
$R_1$ is methyl;
$R_2$ is methyl;
B is OH;
A and D are hydrogen.

12. A compound according to claim 1 wherein:
$R_1$ is ethyl;
$R_2$ is methyl;
B is methoxy;
A and D are hydrogen.

13. A compound of the formula:

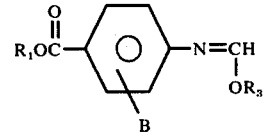

wherein:
$R_1$ is selected from the group consisting of alkyl radicals of from one to five carbon atoms;
B is selected from the group consisting of H, OH, Cl and methoxy;
$R_3$ is selected from the group consisting of alkyl radicals of from one to five carbon atoms.

14. A compound according to claim 13 wherein:
B is hydrogen.

15. A compound according to claim 13 wherein:
$R_1$ is ethyl;
B is hydrogen.

16. A compound according to claim 13 wherein:
$R_1$ and $R_3$ are ethyl;
B is hydrogen.

* * * * *